United States Patent
Lawrence et al.

(10) Patent No.: US 7,586,438 B1
(45) Date of Patent: Sep. 8, 2009

(54) NAVIGATION WITH SATELLITE COMMUNICATIONS

(75) Inventors: David G. Lawrence, Mountain View, CA (US); Michael L. O'Connor, Redwood City, CA (US)

(73) Assignee: Novariant Inc., Menlo Park, CA (US)

( * ) Notice: Subject to any disclaimer, the term of this patent is extended or adjusted under 35 U.S.C. 154(b) by 265 days.

(21) Appl. No.: 11/108,195

(22) Filed: Apr. 18, 2005

Related U.S. Application Data (60) Provisional application No. 60/563,395, filed on Apr. 19, 2004.

(51) Int. Cl.
- G01S 1/00 (2006.01)
- G06F 19/00 (2006.01)
- G06G 7/70 (2006.01)
- G06G 7/76 (2006.01)
- G01C 21/00 (2006.01)

(52) U.S. Cl. .................. 342/357.02; 701/120; 701/207
(58) Field of Classification Search .................. 701/120, 701/207; 342/357
See application file for complete search history.

(56) References Cited

U.S. PATENT DOCUMENTS

| | | | |
|---|---|---|---|
| 4,751,512 A | 6/1988 | Longaker | |
| 5,323,322 A | 6/1994 | Mueller et al. | |
| 5,491,636 A | 2/1996 | Robertson et al. | |
| 5,510,798 A | 4/1996 | Bauer | |
| 5,621,646 A * | 4/1997 | Enge et al. | 701/120 |
| 5,764,184 A * | 6/1998 | Hatch et al. | 342/357.02 |
| 5,828,336 A * | 10/1998 | Yunck et al. | 342/357.02 |
| 5,841,398 A | 11/1998 | Brock | |
| 5,867,411 A | 2/1999 | Kumar | |
| 5,899,957 A * | 5/1999 | Loomis | 701/214 |
| 6,029,111 A * | 2/2000 | Croyle | 701/207 |
| 6,040,798 A * | 3/2000 | Kinal et al. | 342/357.01 |
| 6,195,609 B1 * | 2/2001 | Pilley et al. | 701/120 |
| 6,324,473 B1 * | 11/2001 | Eschenbach | 701/215 |
| 6,356,232 B1 * | 3/2002 | Rocken et al. | 342/357.02 |
| 6,373,432 B1 * | 4/2002 | Rabinowitz et al. | 342/357.16 |
| 6,377,881 B1 | 4/2002 | Mullins | |
| 6,531,981 B1 * | 3/2003 | Fuller et al. | 342/357.03 |
| 6,542,820 B2 | 4/2003 | LaMance et al. | |
| 6,549,846 B1 | 4/2003 | Dance et al. | |

(Continued)

OTHER PUBLICATIONS

Herbert Kramer, Observation of the Earth and its Environment, 2002, Springer, 3rd edition, p. 156 & 185 http://books.google.com/books?id=4JucM8bpLbEC&pg=PA156&lpg=PA156&dq=leo+broadcast+navigation&source=web&ots=G-faLDdb9m&sig=Rdja9fPMRgh77Av0Pc2R6UwLtql#PPA185,M1.*

(Continued)

*Primary Examiner*—Thomas H Tarcza
*Assistant Examiner*—Harry Liu
(74) *Attorney, Agent, or Firm*—Brinks Hofer Gilson & Lione (57) ABSTRACT

A Low Earth Orbiting (LEO) satellite is used for broadcasting differential navigation corrections. Using LEO satellites, the "footprint" of the beam is much smaller than for geosynchronous satellites. Datalink bandwidth requirements are reduced to sufficiently cover an entire footprint area. With a LEO satellite transmitting in multiple beams, these footprints become even smaller. Corrections targeted to such a small area provide local area corrections broadcast from the LEO satellites. Payment, discounts, subsidies or charges are arranged to encourage different entities to own or host base stations, resulting in wide distribution of the network of base stations for use with satellite communications.

18 Claims, 2 Drawing Sheets

U.S. PATENT DOCUMENTS

| | | | |
|---|---|---|---|
| 6,560,534 | B2 | 5/2003 | Abraham et al. |
| 6,670,915 | B1* | 12/2003 | McBurney et al. ..... 342/357.12 |
| 6,707,424 | B1* | 3/2004 | Snyder et al. .......... 342/357.14 |
| 2003/0233030 | A1 | 12/2003 | Rice |
| 2004/0006424 | A1 | 1/2004 | Joyce et al. |
| 2004/0145517 | A1 | 7/2004 | Kinal et al. |
| 2004/0166801 | A1* | 8/2004 | Sharon et al. .............. 455/12.1 |
| 2004/0203850 | A1 | 10/2004 | Oesterling |
| 2005/0114022 | A1* | 5/2005 | Podshivalov et al. ........ 701/213 |

OTHER PUBLICATIONS

Changdon Kee. *Wide Area Differential GPS*. 1994. Standford, California.

Satellite Journal International. *Satellite News NA V1.5*. Apr. 14, 2005. <http://www.sat-net.com/listserver/sat-na/msg00016.htm>.

C. Rizos, T. Yan, S. Omar, T. Musa, D. Kinlyside. *Implementing Newtwork-RTK: The SydNET Cors Infrastructure*. The 6$^{th}$ International Symposium on Satellite Navigation Technology Including Mobile Position & Location Services. Jul. 22-25, 2003. Melbourne, Australia.

Orbiter and Radio Metric Systems Group. *Real-Time GIPSY Software*. Apr. 14, 2005. <http://gipsy.jpl.nasa.gov/orms/rtg/index.htm>.

OmniSTAR USA, Inc. *OmniSTAR—How It Works*. Apr. 14, 2005. <http://www.omnistar.com/howitworks.html>.

Herbert Kramer, "Observation of the Earth and its Environment", 2002, Springer, 3$^{rd}$ edition, pp. 156 & 185, http://books.google.com/books?id=4JucM8bpLbEC&pg=PA156&lpg=PA156&dq=leo+broadcast+navigation&source=web&ots=G-fALDdb9m&sig=Rdja9fPMRgh77AvOPc2R6UwLtql#PPA185,M1.

USPTO Office Action dated Mar. 4, 2008 for related U.S. Appl. No. 11/108,194.

USPTO Office Action dated Aug. 7, 2008 for related U.S. Appl. No. 11/108,336.

* cited by examiner

NAVIGATION WITH SATELLITE COMMUNICATIONS

RELATED APPLICATIONS

The present patent document claims the benefit of the filing date under 35U.S.C. § 119(e) of Provisional U.S. Patent Application Ser. No. 60/563,395, filed Apr. 19, 2004, which is hereby incorporated by reference.

BACKGROUND

Many DGPS corrections networks exist, including FAA WAAS, OmniStar, JPL, USCG Beacons, local commercial networks, local community cooperatives networks, and local government funded networks. In the above examples, the deployment and maintenance of the reference station hardware is funded in one of the following ways: the government, commercially (paid for by subscriptions from users), commercially (deployed to encourage sales of receivers) or margins on roving units pay for reference network privately. The network owns and/or operates the reference stations.

In wide area networks (e.g., WAAS, OmniStar, and JPL), geosynchronous satellites provide differential correction information. The footprint of the beams from the geosynchronous satellites is large, resulting in a wide area network. A relative few, such as 10-30, reference stations are provided in any footprint of the geosynchronous satellites for hemisphere corrections. The reference stations send differential corrections on land lines to a central facility. Weather based model information for further improving location calculation may also be generated by the central facility. The central facility provides the differential corrections and any model information to the geosynchronous satellites for beaming to mobile devices. The mobile devices determine location with differential based accuracy from global positioning satellite (GPS) signals, the differential corrections and any model information. The closest reference station may be over 100 miles away from the mobile device. However, carrier phase based position determinations may provide about 5-12 inch level accuracy.

For local area systems (e.g., USCG Beacons), terrestrial based communications provide differential corrections. One or more local reference stations transmit differential corrections on a radio transmitter or modem. Receivers within the range of the radio transmitter or modem calculate position based on the differential corrections and signals received from the reference stations.

BRIEF SUMMARY

As satellite navigation and satellite communications both increase in use, there is significant value to be gained by combining local-area and wide-area technologies. Low earth orbit (LEO) satellite communications are used to broadcast differential corrections and/or model information to multiple mobile devices. The LEO communications replace, supplement or provide redundancy for terrestrial radio transmission of the differential corrections. The footprint of a LEO satellite beam is about 100-300 miles, so differential corrections within about 100-300 miles are provided for each beam. These corrections allow for carrier based accuracy of approximately one inch.

To deploy a sufficient number of reference stations for use with a LEO based differential correction network, separate ownership or cost advantages for hosting a reference station are given to users. Since many reference stations are sold for local uses, the reference stations are also equipped to communicate differential corrections for broadcast by LEO satellites. Any extra communication equipment is provided free of charge, at cost, with payment or with a usage benefit. The local reference stations are then used within the LEO based network in addition to or as an alternative to local uses. The LEO based network uses local reference stations managed or owned by many entities.

In a first aspect, a system is provided for communicating navigation related information. A satellite transmitter, receiver or transceiver electrically connects with a navigation receiver.

In a second aspect, a method is provided for communicating navigation related information. Satellite navigation signals are measured with a base station. Information responsive to the measurement is transmitted from the base station directly to a satellite.

In a third aspect, a method is provided for communicating navigation related information. Satellite navigation signals are measured at a reference station. Data responsive to the measuring is broadcast to users from a low earth orbit satellite.

In a fourth aspect, a system is provided for communicating position information. Reference stations are operable to determine navigation measurements. One or more low earth orbit satellites are operable to broadcast data responsive to the navigation measurements to receivers.

In a fifth aspect, a method is provided for deploying a differential positioning network. Base stations are sold to different entities. The base stations are included in the differential positioning network.

In a sixth aspect, a method is provided for deploying a differential positioning network. Low earth orbit communication of differential correction data is provided in the differential positioning network. Different entities are allowed to own different base stations for use in the differential positioning network.

In a seventh aspect, a method is provided for deploying a differential positioning network. Low earth orbit communication of differential correction data is provided in the differential positioning network. Different entities host different base stations for use in the differential positioning network. The different entities are charged less for the differential correction data than other entities without base stations in the differential positioning network.

In an eighth aspect, a system is provided for communicating position information. A plurality of reference stations is operable to make navigation measurements. One or more satellites are operable to broadcast data responsive to the navigation measurements to multiple receivers.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Figure 1:
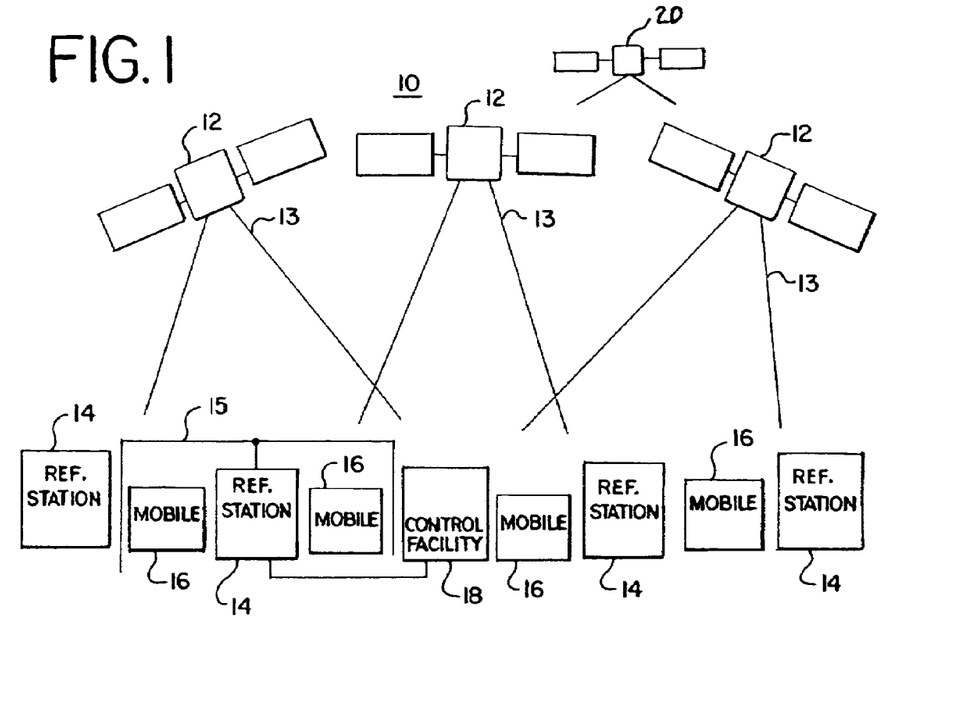
FIG. 1 is a block diagram representing one embodiment of a differential positioning network using satellite communications.

FIG. 1 shows a network 10 for communicating navigation related information. The network 10 is of any desired scope, such as a worldwide, continent wide, country wide, region wide or local area. The network 10 provides increased accuracy through differential corrections, modeling or other navigation measurements using one or more reference or base stations. A plurality of receivers 16 or even substantially stationary receivers (e.g., land drift or earthquake monitoring stations) may determine a current position more accurately through use of the network 10.

The network 10 includes one or more satellites 12, one or more reference stations 14, one or more receivers 16 and one or more centralized processing facilities 18. Receivers 16 are devices which may or may not be capable of moving. By way of example only, receivers 16 may be affixed to vehicles (intended to move), may be stationary devices which are used for system integrity monitoring (intended not to move), or may be affixed to a semi-stationary object such as a bridge, building, or tectonic plate (intended to move only slightly). Additional, different or fewer components of the network 10 may be provided, such as the network 10 without the centralized processing facilities 18. The reference stations 14 may be used a differential navigation base or reference stations. The reference stations 14 collect navigation measurements, and communicate these measurements to other users (e.g., the receivers 16) of the same navigation signals, or to the centralized processing facility 18. As used herein, users may be an entity (e.g., corporation), a person or a device (e.g., the receiver 16). The measurements are communicated through one or more of the satellites 12.

Figure 2:
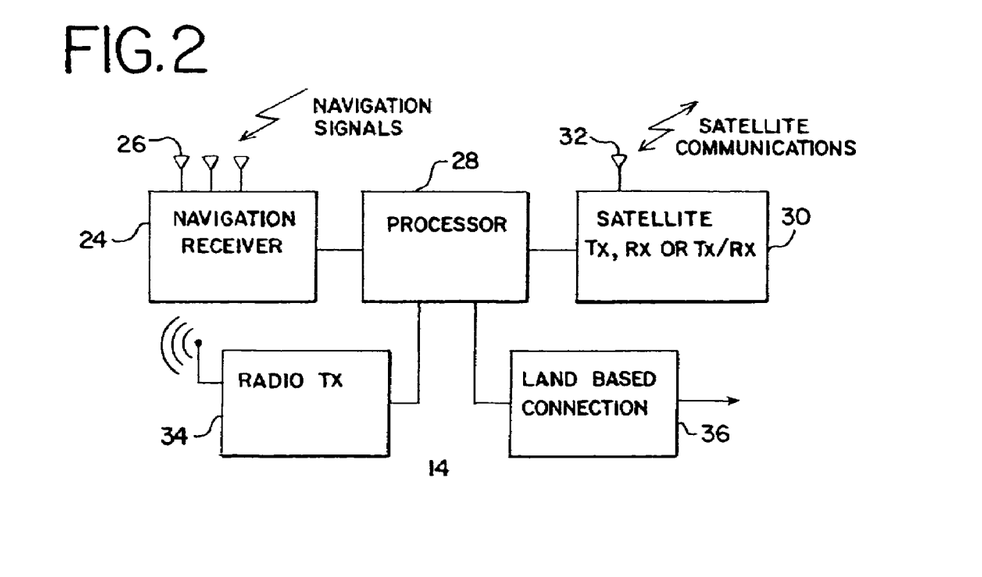
FIG. 2 is a block diagram of one embodiment of a reference station in the network of FIG. 1.

FIG. 2 shows one embodiment of a reference station 14. The reference station 14 is a base station that provides reference information for use by other devices. The reference station 14 includes a navigation receiver 24 connected with one or more antennas 26, a processor 28, a satellite transmitter, receiver or transceiver 30 connected with an antenna 32, a radio transmitter 34 and a land based communications connection 36. Additional, different or fewer components may be provided. For example, the reference station 14 may not include the land based communications connection 36. As another example, the reference station 14 may not include the radio transmitter 34. Where a plurality of reference stations 1-4 is provided in the network 10, each reference station 14 may have a same or different configuration.

The navigation receiver 24 connects with one or more, such as two or three, antennas 26. The antennas 26 are on a same housing with or spaced away from the navigation receiver 24. The antennas 26 receive and pass to the navigation receiver 24 one or more of the following types of signals: GPS signals, GLONASS signals, GALILEO signals, psuedolite signals, or synchrolite signals. Using tracking or correlation based on code phase, carrier phase or both code and carrier phases, the navigation receiver 14 determines locations of each of antennas 26. The navigation receiver 14 tracks one or more of the following signal sources: GPS L1 signals, GPS L2 signals, GPS L5 signals, GLONASS signals, GALILEO signals, pseudolite signals at any frequency, and/or synchrolite signals at any frequency. The navigation receiver 14 may track other now known or later developed signals for navigation or position determination. In one embodiment, the navigation receiver 14 is an IntegriNautics Quasar GPS L1+L2 receiver.

The satellite transmitter, receiver or transceiver 30 (satellite transceiver 30 herein for ease of reference where appropriate) is a processor, handset or other device capable of communicating with the satellites 12. For example, the satellite transceiver 30 is an Iridium, Globalstar, or Inmarsat transceiver. Other now known or later developed devices for one or two way communications with a low earth orbit, geosynchronous or other satellite 12 may be used.

The satellite transmitter, receiver or transceiver 30 transmits and/or receives data, such as navigation receiver correction data, location information, voice, or video. The communications are based on point-to-point communications, such as the satellite transmitter, receiver or transceiver 30 calling a specific number or using a specific channel for transmissions and receiving information from a specific number or using a specific channel in communications with the satellites 12. Alternatively, information is received from a broadcast signal not addressed to a specific satellite receiver or transceiver 30, such as receiving broadcast corrections. The antenna 32 is used for both transmission and reception. Alternatively, separate antennas 32 are used for transmission or reception.

The satellite transceiver 30 connects with the navigation receiver 24, such as through the processor 28. The satellite transmitter, receiver or transceiver 30 (satellite transceiver 30 herein for ease of reference) shares a single enclosure and is electrically connected with hard wire with the navigation receiver 24. Alternatively, separate housings are provided but positioned adjacent each other, such as within ten yards of each other. Greater or lesser spacing may be provided. In one embodiment, the satellite transceiver 30 and the navigation receiver 24 are in separate housings one a same tower or reference station 14 support structure.

The processor 28 is a computer, microcontroller, general processor, a digital signal processor, a control processor, a field programmable gate array, an application specific integrated circuit, a digital circuit, an analog circuit, combinations thereof or other now known or later developed device for communicating between the navigation receiver 24 and the satellite transceiver 30. In one embodiment, the processor 28 is an embedded Intel x86 computer in a PC-104 form factor. The processor 28 communicates with the navigation receiver 24 and the satellite transceiver 30 for transferring data. The specific details of data transfer can be set by the software in the processor 28, or may be controlled by users of the reference station 14. Such control may be performed through the other components, such as a user communicating with the satellite transceiver 30 or by a direct connection to the processor 28 through a data link or user interface. The processor 28 is dedicated to intercommunications and any associated processing or is utilized to perform other functions as well. For example, the processor 28 is a part of either the navigation receiver 24 or the satellite transceiver 30.

The radio transmitter 34 is a radio modem, cellular telephone, "wi-fi"-type wireless communication system, "Bluetooth"-type wireless communication system, combinations thereof or other now known or later developed local area radio transmitter. In one embodiment the radio transmitter 34 is a Freewave 900 MHz band radio modem. The radio transmitter 34 connects with the navigation receiver 24, the processor 28 or the satellite transceiver 30 for transmitting differential corrections or other information to local users. As represented in FIG. 1, the radio transmitter 34 of the reference station 14 generally covers the local area 15, but the signals are limited to a lesser region than the region of operation of the network 10. The locally or terrestrially transmitted differential corrections, such as GPS differential corrections, are used by any local mobile devices 16 or specific registered local mobile devices 16 with navigation signals from navigation satellites 20, possibly also including pseudolites and/or synchrolites, for differential position determinations. Improved accuracy or integrity is provided by the transmitted differential corrections.

The optional radio transmitter 34 may have other purposes. For example, the radio transmitter 34 transmits or receives messages through a wireless connection with other devices. A wireless terrestrial connection to a communications network, such the Internet or other computer network, is provided in other embodiments.

The land based communications connection 36 is an Internet connection through a modem, a direct modem, DSL, cable modem, ISDN line, fiber optic line, Ethernet connection or other now known or later developed land based network or point-to-point communications system. The land based communications connection 36 connects with the navigation receiver 24, the processor 28 or the satellite transceiver 30. Differential corrections, other navigation measurements, reference station status or performance information, or other communications (e.g., from the radio transmitter operable to also receive data or from the satellite transceiver 30) are transmitted by the land based communications connection 36. Similarly, instructions, differential corrections, local inputs (e.g., local weather station inputs), other navigation measurements, networked clock information, mobile device location or requests, or other communications are received on the land based communications connection 36 for processing within the reference station 14 or communication through terrestrial wireless or satellite. Alternatively, the radio transmitter 34 or a radio receiver or transceiver transmits or receives this data.

The land based communications connection 36 may be used in different modes. In one mode, a direct connection is made between the reference station 14 and the centralized processing facility 18 to get real-time data for dissemination through the satellite network 10. In a second mode of operation, the reference stations 14 connect to a local ISP dialup service and establish an Internet connection. Later commands received via the internet may cause a switch to the direct connection mode. The centralized processing facility 18 monitors data from the "hot spare" reference stations 14 and adaptively choose which reference stations 14 switch to real-time direct connection mode for satellite dissemination of information. In a third mode, land based communications connections 36 are used for transmitting non-real-time data, such as model or corrections used over a long time period for modeling. The multi-mode may allow more reference station network scalability without the need for scaling up the direct link infrastructure at the centralized processing facilities 18.

The land based communications connection 36 may provide an internet connection on an Ethernet port to the operator of the reference station. In the direct connection mode, the centralized processing facilities 18 may act as the ISP in addition to collecting correction data. This may encourage the operator to pay for the dedicated phone line and ISP. Alternatively, satellite communications are used instead of land based communications.

The reference station 14 is powered by a battery, a wind activated generator, a solar array, a power grid, a generator, or combinations thereof. For more remote locations or where the reference station 14 may be repositioned, non-wired power sources are used. Where available, a wired power source with or without a back-up is used.

Once operational or after being installed, any reference station 14 may monitor performance. For example, each reference station 14 may identify antenna movement, obstructions, and/or excessive multipath interference. Signal strength, noise, changes from previous parameters (e.g., movement of location of an antenna) or other information is compared with or without thresholds to identify poor performance. Alternatively, other network components, such as the centralized processing facility 18, may identify poor performance of a specific reference station 14 based on received data. Where poor performance is detected, the transmission of navigation measurements may be limited or ceased. An owner of the reference station may be contacted for persistent poor performance or a repair technician automatically dispatched.

As shown in FIG. 1, the reference stations 14 in the network 10 determine navigation measurements for different areas or regions with or without overlap. The navigation measurements are based on signals received from one or more, such as three or four navigation satellites 20. The network 10 communicates the navigation measurements, such as corrections or model related information, to other components of the network 10. The communications are through the satellites 12, terrestrially or combinations thereof. The communications are point-to-point, broadcast or routed within the network using addresses.

Within the network 10, a plurality of reference stations 14 determine navigation measurements, such as calculating differential corrections. The differential corrections are directly transmitted from the respective reference stations 14 to one or more of the satellites 12. For example, each reference station 14 places a call using a low earth orbit communications device to a low earth orbit satellite 12 with a beam 13 currently having a footprint over the reference station 14. Different reference stations 14 communicate with the same or different satellites 12 at a given time. Where the satellites 12 are not geosynchronous, the footprint of the beam 13 changes position as a function of time. Any ongoing communications may be passed from one satellite 12 to another.

To provide for multiple communications with a same satellite 12 or a same satellite communications network, the reference stations 14 transmit data to the satellites 12 in a time division multiplexed, frequency division multiplexed, code division multiplexed, spread spectrum or other format. The satellites 12 may broadcast or directly send communications format instructions, such as time slot assignments, to the reference stations 14 for satellite communications.

The network 10 transmits differential corrections, model information or other navigation measurements from the differential navigation reference stations 14 to multiple users, such as the receivers 16, through satellite communications. For example, differential corrections or model parameters to update a model (e.g., parameters of a 3 dimensional delay profile or atmospheric parameters) from the differential navigation reference stations 14 are communicated directly to the one or more satellites 12. Alternatively, the differential corrections from the differential navigation reference stations 14 are routed through the centralized processing facility 18 to the one or more satellites 12. The satellites 12 broadcast the information on appropriate beams 13 for use by the receivers 16.

The centralized processing facility 18 is an uplink facility, downlink facility, antenna, processor, computer, network or other device for processing navigation information and communicating one or two way with the satellites 12 and/or the reference stations 14. More than one centralized processing facility 18 may be provided, such as where the network 10 is divided into a plurality of regions or for redundancy. In one embodiment, the centralized processing facility 18 connects via a land or terrestrial connection with one, more or all of the reference stations 14. Alternatively, satellite communications are used to communicate between the centralized processing facility with one, more or all of the reference stations 14. A reference station 14 may be provided at the centralized processing facility 18.

The reference stations 14 transmit navigation measurements to the centralized processing facility 18. The centralized processing facility 18 stores the information for later use, provides information for monitoring operation of the network 10, transmits instructions for one or more components of the network 10, receives requests for assistance, information or instructions from one or more components of the network 10, or assists in navigation determinations. For example, the centralized processing facility 18 generates or refines models used for refining position determinations. Weather, atmosphere, orbital, combinations thereof or other models are used.

In one embodiment, the model information is determined from differential corrections received over a time period, such as weeks or years. The model information is then transmitted to the reference stations 14 or the receivers 16 for use measuring satellite signals or determining position. As another example, the centralized processing station 18 receives corrections from one satellite 12 and communicates the corrections for broadcast by another satellite 12 that did not receive the corrections directly from a given reference station.

In one embodiment, differential corrections are provided by the reference stations 14 for rebroadcasting by the satellites 12 in real time. Model refinements, such as an indication that a time period or parameter of a model should be changed based on current data, may also be transmitted by the reference stations 14. The satellites 12 broadcast the differential corrections and model refinements in substantial real-time or as received for use by the receivers 16. The centralized processing facility 18 receives the broadcast information. Alternatively, some or all of the information is routed terrestrially to the centralized processing facility 18. In non-real time or over a time period, the centralized processing facility 18 updates or generates model information from the differential corrections. The model information is communicated to the reference stations 14 and/or the receivers 16 through the satellites 12. Alternatively, some or all of the model information is communicated terrestrially.

Different routes of communication may be used for the same type of data. For example, at a given time, some reference stations 14 transmit differential corrections directly to the one or more satellites 12, and other reference stations 14 transmit navigation measurements, such as differential corrections or model information; to the centralized processing facility 18 through terrestrial and/or satellite communications. Some reference stations 14 do not provide data for rebroadcast by the satellites 12 to the receivers 16 as redundant or not needed, but provide the information to the centralized processing facility 18 for analysis or generation of models.

The satellites 12 include antennas and a processor for receiving and/or transmitting information. The satellites 12 are low earth orbit, geosynchronous, other satellites or combinations thereof. In one embodiment, the satellites 12 are separate and different from the navigation satellites 20, such as GPS satellites. Alternatively, the navigation satellites 20 also perform the functions of the network satellites 12.

The satellites 12 broadcast data responsive to the navigation measurements to the receivers 16 or multiple users. Rather than a point-to-point or addressed communication, the satellite 12 rebroadcast differential corrections and/or model information from one or more reference stations 14 for general distribution. The information is broadcast on one or more beams 13 of the one or more satellites 12. The broadcast occurs substantially in real-time or without intervening transmissions related to the information. The information may be communicated directly between satellites 12 or through the centralized processing station 18 for broadcast from more than one satellite 12 at a substantially same time.

Since the footprint of beams 13 for low earth orbit or other satellites 12 continuously changes, the information is dynamically distributed between different satellites 12 so that navigation measurements appropriate for a given region are transmitted to that region. Each satellite 12 broadcasts data responsive to a sub-set of reference stations 14 at a given time, such as data from reference stations 14 within or adjacent to the footprint of the beams 13 of each satellite 12. The reference stations 14 communicate with the satellite 12 with a beam 13 currently covering the reference station 14. As different satellites 12 cover the reference station 14, the communications with the previous satellite 12 cease. The satellite 12 receiving the information broadcasts the information. The data broadcast by the satellites 12 varies as a function of the location of the beam 13. Alternatively, the satellite 12 orients or repositions the beam 13 to maintain the footprint on a desired region for a given amount of time. In yet other alternative embodiments, the information is communicated to the receivers 16 or reference stations 14 through a satellite 12 by point-to-point communications.

Low earth orbit satellites 12 may have several antenna beams 13 each focused on different regions of the satellite's 12 overall footprints. Each beam 13 might service an area much smaller, such as on the order of 100 times smaller, than the footprint of a geosynchronous earth orbit satellite used for GPS correction data. Each beam 13 includes information from different reference stations 14 based on the reference stations 14 covered by the given beam 13. Alternatively, each beam 13 of a same satellite 12 includes the information received from reference stations 14 in two or more of the beams 13 and corresponding footprints. Whether beam 13 or satellite 12 specific, the navigation measurements broadcast by the satellite may be locally optimized to provide corrections applicable to users in that beam or beams.

Any number of reference stations 14 is included in the network 10. A specific satellite 12 at a given time may communicate with many reference stations 14 depending on density. To limit the costs associated with satellite communications, the data bandwidth of the communications to or from the satellites 12 is limited. For example, some corrections are selected and others are not selected for transmission by a reference station 14 to a satellite 12. As another example, navigation measurements from some reference stations 14 are communicated, and navigation measurements from other reference stations 14 are not communicated. The reference stations 14, the centralized processing facility 18, and/or the satellites 12 limit the data bandwidth or make the selections for limiting bandwidth. The selections are communicated to other components of the network 10 or each component makes independent selections. Several embodiments for limiting data bandwidth or selecting information for communication are given herein. These embodiments may be used separately or in any combination.

One embodiment accounts for possible sources of error by reference stations 14. There are three classes of environmental factors that may cause reference stations 14 to solve for a position different than a position previously calibrated. Poor performance may be identified by a sufficiently different position determination by a reference station 14. In one class (class 1), measurement errors are specific to that individual reference station 14. Examples of this class of error are local multipath and receiver noise. In a second class (class 2), errors are from motion of reference station. For example, swaying or leaning of an improperly installed reference station or intentional relocation introduce errors. In a third class (class 3), measurement errors result from local region effects. Such local region effects also affect nearby receivers 16 as well. For example, atmospheric delays affect a region, specifically those atmospheric delays that affect one reference station but not those reference stations from which the currently broadcast corrections were derived. Such atmospheric delays may be caused by the ionosphere or by the troposphere. Multi frequency receivers (e.g.: L1/L2) may measure changes in the ionosphere by measuring divergence between L1 and L2. However, some such divergence is caused by multipath, so a well-installed multiple antenna reference station is better able to distinguish ionosphere than a receiver. The dense network 10 of reference stations 14 acting together to build a model of the ionosphere may provide better corrections to a user than the user can generate by observing L1/L2 divergence alone.

One or more residual computations are performed to look for the presence of error sources, such as a residual calculated using a constrained position. In some embodiments, only one antenna and associated residual is determined. In other embodiments, an array of antennas is provided. If the magnitude of another residual associated with a relative position between two or more antennas of a same array is large, there may be two causes or a combination of the two causes. The position was wrong (class 2) or the errors of class 1 were big. If the errors were big, the errors may fall into class 1 or class 3 above. In order to decide if a reference station 14 that has high residuals has new information that needs to be shared with the network 10 or if the reference station should keep quiet, the reference station 14 classifies the cause. In the case of class 1 and class 2 errors, the reference station 14 should keep quiet or not transmit erroneous navigation measurements. In the case of class 3 errors, the reference station 14 should uplink corrections or model updates for use by the centralized processing facility 18 and/or receivers 16.

The reference station 14 determines whether the antennas 26 have moved to isolate class 1 errors. Large scale motion (on the order of several meters or more) results in residuals so large as to be inconsistent with other error sources. Smaller-scale motion is harder to isolate, but the goal is to decide if any error is class 1/2 or class 3. Using multiple antennas 26 connected to the reference station 14, likelihood of small-scale motion is identified. If the reference station 14 or antennas 26 are swaying or have leaned, chances are that the relative orientation of the array of antennas 26 also has changed. A residual is calculated for each baseline of the array of antennas 26 given the previously calibrated relative positions of the antennas 26 in the array. These residuals are not to be confused with the residual for the absolute position of the reference station 14 discussed above. If the baseline residuals are large, either the reference station 14 has moved (class 2) or there are reference station specific error sources that are unlikely to be common to any local users (class 1).

Another way to detect multipath (the predominant class 1 error source) is to look at signal strength profiles and carrier/code divergence. If the signal strength for a satellite 12 is fluctuating with a large amplitude about the expected signal strength for a satellite 12 at that elevation, the variation is likely a result of multipath. Similarly, significant variation of the code phase minus the carrier phase (corrected for ionosphere using multiple frequencies) is another sign of multipath.

In one embodiment, the reference stations 14 each have a plurality of antennas 26, and some or all of the reference stations 14 operate for a plurality of frequencies (e.g. L1 and L2). Some reference stations 14 might have more antennas 26 than others. A few reference stations 14 with a higher number of antennas 26 (e.g., 7-8) are deployed in a region the size of a satellite beam 13. Other reference stations 14 have fewer antennas 26 (e.g., 1-4). Alternatively, the reference stations 14 all have a same number of antennas 26. Once a reference station 14 decides to transmit corrections to a satellite 12, those corrections are derived by combining information from all of the reference station antennas 26 to average out multipath. Because multipath errors often have a sinusoidal profile, an individual antenna 26 does not have very gaussian error distributions. The probability density function of a sinusoid is U shaped instead of the upside-down U shape of a Gaussian. With multiple antennas 26, the error distribution has a more Gaussian like distribution.

In addition to using error analysis for limiting bandwidth, the error analysis may be used for monitoring reference station performance as discussed herein. For modeling or updating model information, some or all of the reference stations 14 may include weather sensors.

In one embodiment, a user contacts the network 10 and requests a specific reference station 14 for a certain period of time. Any component of the network 10, such as a reference station 14, a satellite 12 or the centralized processing facility 18 receives the request from a person or from a device. The request is provided through a user interface, such as a user interface of a reference station, via a satellite call, or via terrestrial communication. The request is for navigation measurements from a specific reference station 14 to be included in broadcasts from the satellites 12. The requested navigation measurements are broadcast for beams 13 covering the requested reference station 14. Alternatively, the user, such as a mobile device 16, indicates an area of interest or location, and the requested navigation measurements are broadcast on beams 13 covering the identified area. The user may more likely ensure that the nearest reference station 14 provides the navigation measurements, more likely providing the best overall navigation system performance.

In another embodiment, the network 10 determines the subset of reference stations 14 based on the locations of active users. Navigation measurements are provided through the satellites 12 that best serve the current active users. The users, such as mobile devices 16, report their locations to the network 10. For example, a satellite transmitter on the mobile device 16 communicates with a satellite 12 to provide location information. The network 10, such as the satellite 12, one or more reference stations 14 or the centralized processing facility 18 determines a set of reference stations 14 and associated navigation measurements to transmit based on the locations of the active users. The determination is specific to each satellite 12 or each beam 13 at a given time or footprint location. For each possible reference station 14 set, the sum of the square of the distances from each user to the nearest included reference station 14 is computed. The optimal set is then chosen to be the set that minimizes the sum of the square of these distances. Weightings could also be applied in order to favor some users over other users. Other computations may be used.

In another embodiment, the data bandwidth is limited by applying weighting functions to reference stations 14. The weighting functions include any desired function or combinations of functions. For example, the weighting function favors some users over others. The weighting functions are set or vary as a function of time. For example, the weighting functions favor reference stations near major highways during commuting hours, but a more even distribution is provided for other times. As another example, the weighting function favors reference stations 14 in farming areas during critical planting and harvesting seasons. As the planting or harvesting changes location as a function of time, the density of reference stations 14 and associated navigation measurements broadcast to users changes for each given location or area covered by a satellite 12, beam 13 or network 10.

In yet another embodiment, the network 10 transmits navigation measurements associated with an even distribution throughout a region. At frequent intervals, the network 10 determines which reference stations 14 are healthy and operable to transmit for the area in range of satellite coverage. The network 10 chooses the set of reference stations 14 that provide the most even distribution throughout the region of coverage, such as a region of each beam 13. The reference stations 14 receive broadcast navigation measurements with or without information identifying a density or list of available reference stations 14. Each reference stations 14 use a set or pre-determined number of reference stations 14 and the location of reference stations 14 already transmitting to determine whether the reference station 14 should also transmit navigation measurements to the satellite 12. Alternatively, the centralized processing facility 18 selects the reference stations 14.

As an alternative to even distribution, the network 10 transmits corrections or model information for reference stations 14 that are nearest a specific point or set of points. For example, the reference stations 14 which lie closest to the center of major cities are selected. The set of reference stations 14 that minimizes the sum of squares of the distances from reference stations 14 and the selected points is computed. Alternatively, a given reference station 14 a satellite 12 identifies whether the given reference station 14 is closer to the selected point than another reference station 14. If closer, the reference station 14 transmits navigation measurements for satellite broadcast. If the maximum number of reference stations 14 are already transmitting, then the reference station furthest from the selected point is replaced with the given reference station 14. The furthest reference station 14 notes broadcast of information from the closer given reference station 14 and ceases transmission or ceases transmission in response to broadcast or point-to-point instructions. Other processes for selecting reference stations based on a selected point may be used.

In another embodiment, different reference stations 14 are selected at different times as a function of likely need. For example, reference stations 14 observed to be in regions of faster changing atmospheric delays send corrections more frequently than reference stations 14 in regions of slower changing atmospheric delays. Other factors than atmospheric delays may be used. As another example, the network 10 identifies undesirable performance by one or more of the differential navigation reference stations 14. For example, a reference station 14 receives broadcast differential corrections. The differential corrections are identified as inaccurate or as not appropriate for the receiving reference station 14. The receiving reference station 14 is selected for inclusion and sends navigation measurements.

The selection of reference stations 14 limits data bandwidth for communications to the satellites 12. Alternatively or additionally, selection limits bandwidth for broadcast from satellites 12.

As an alternative or in addition to selecting reference stations 14 and associated navigation measurements, the data bandwidth is limited by compression of the communications. Compression includes lossy or non-lossy data compression. Compression may also include selection of some data for transmission and not other data. For example, the compression is achieved by excluding redundant information. Each reference station 14 receives the navigation measurements broadcast by a satellite 12. Each reference station 14 determines whether the navigation measurements are redundant to the navigation measurements from the other reference stations 14. Only non-redundant corrections or model information are transmitted to the satellite 12 for dissemination.

If a reference station 14 uplinks corrections that are erroneous (e.g., the reference station erroneously classified the cause of a high residual), other reference stations in the network may identify the error. The other reference stations 14 uplink a message to tell the reference station 14 providing the erroneous information to cease transmitting or reset. Given a sufficiently high-density network 10, nearby reference stations 14 that were not previously sending corrections to the satellites 12 may begin providing the navigation measurements as well as notify the bad reference station 14.

In another example, compression is achieved by the reference stations 14 sending a combination of navigation observables and atmospheric model parameters. Rather than every reference station 14 sending all the navigation measurements made, different reference stations 14 send different combinations of information.

The receivers 16 receive the broadcast navigation measurements and navigation signals from one or more of the navigation satellites 20. The receivers 16 each determine a location with the navigation measurements and the navigation signals. For example, a receiver 16 determines a code and carrier phase based position from GPS navigation signals and the differential corrections from one or more reference stations that received the same GPS navigation signals. The differential corrections are provided by the satellites 12. Model or model information may be used to refine the position determination.

Figure 3:
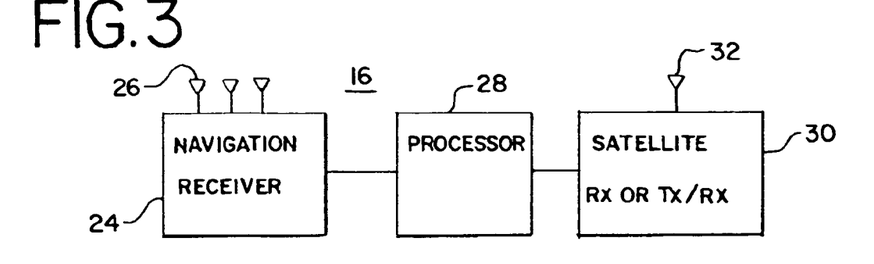
FIG. 3 is a block diagram of one embodiment of a receiver in the network of FIG. 1.

FIG. 3 shows one embodiment of a receiver 16. The receiver 16 includes a navigation receiver 24 connected with one or more antennas 26, a processor 28 and a satellite receiver or transceiver 30 connected with an antenna 32. Additional, different or fewer components may be provided. For example, a radio receiver receives local differential corrections transmitted directly from a local reference station 14. The local differential corrections, satellite provided corrections or both types of corrections are used to determine a position of the receiver 16 at a given time.

The components of the receiver 16 are the same or different than used for the reference station 14 of FIG. 2. For example, the navigation receiver 24 of the receiver 16 connects with a single antenna 26 and has a single channel for tracking. As another example, the satellite receiver 30 only receives data from the satellites 12 without transmitting information. Alternatively, location or other information is transmitted to the satellite 12 for reference station 14 selections. Different receivers 16 have the same or different structure. For example, different receivers 16 are provided by different manufacturers for use in the same network 10.

Figure 4:
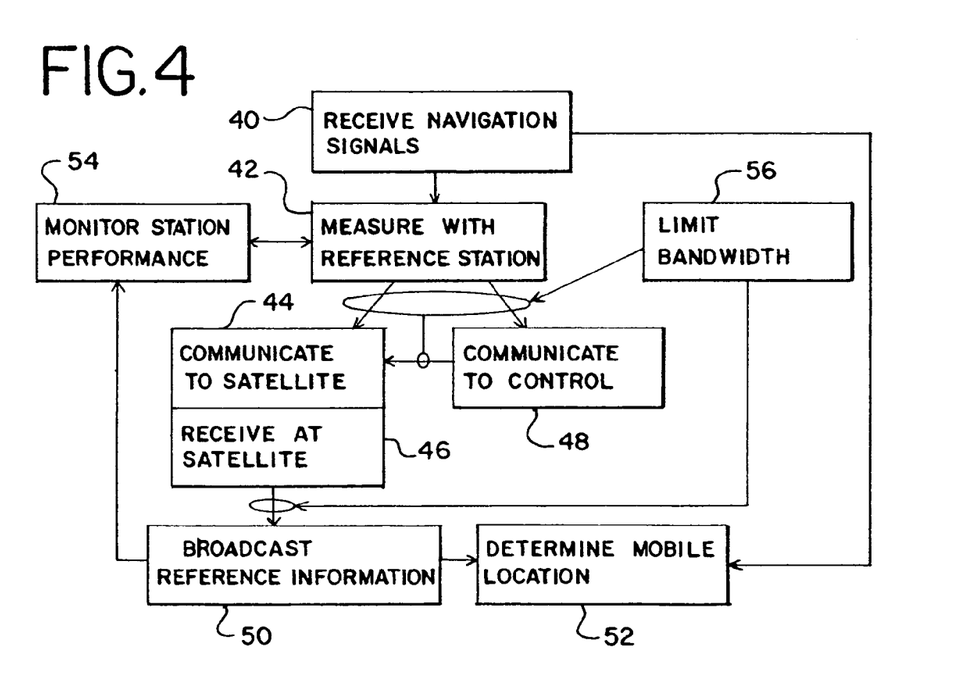
FIG. 4 is a flow chart diagram of one embodiment of a method for communicating position information with a satellite.

FIG. 4 shows one embodiment of a method for communicating navigation related information. The method uses the network 10 of FIG. 1, a different network, the reference station 14 of FIG. 3, a different reference station 14, the mobile device 16 of FIG. 3 or a different mobile device 16. The acts-shown in FIG. 4 are performed in the order shown or a different order. Additional, different or fewer acts may be provided. For example, acts 48, 54 and/or 56 are optional.

In act 40, navigation signals are received. One or more antennas receiver navigation signals from one or more navigation satellites. For example, navigation signals from four or more satellites are received on a single or separate antennas. The antennas are provided on one or more reference stations and one or more mobile devices. Some of the same satellite signals are received at one reference station and one mobile device.

In act 42, the satellite navigation signals are measured with the base or reference station. The navigation signals are measured for each of the antennas or for each of different channels for a same antenna. The navigation signals are measured by tracking the code and/or carrier phase of the received navigation signals. The location of the base station is known. The location is known by surveying, by assignment, by selection of a position determined from navigation signals or by averaging positions determined by navigation signals or a period of time. The location determined by tracking the navigation signals is compared against the known location. The offsets or differences are computed as differential corrections.

Where multiple antennas are available, different locations are provided for each antenna. The differential corrections determined for the antennas are averaged or maintained separately.

The measured navigation signals may also be compared with one or more models. Where the model does not correction predict the differential corrections or location, the model may be updated. Alternatively or additionally, other measurements, such as pressure or temperature, provide model information.

The same or different satellite navigation signals are measured with additional base stations. Since different base stations may receive navigation signals from different satellites with some or no overlap of satellites for different stations, different measurements are provided. Due to differences in location, different atmospheric or other effects on the navigation signals may result in different differential corrections.

In act 44, the differential corrections and/or model information are transmitted by the base stations to the satellites, such as low earth orbit satellites. Some base stations associated with a same beam or beams of a same satellite at a given time may transmit the information to the same satellite. Base stations associated with different satellite footprints at a given time transmit to different satellites. Where the beams from different satellites overlap, the information is transmitted to a selected satellite or multiple satellites. The selected satellite is selected based on a more central location of the base station within the beam, a likely or actual distribution of mobile devices relative to the possible beams, path of travel of the footprint over time or other factors.

The navigation measurements are transmitted directly to the satellites, such as transmitting without routing through intervening components. Alternatively, indirect communication is provided. The transmissions are formatted for use with the satellite constellation. For example, time division multiplexing or other signal separation format is used to transmit from different base stations to a same satellite or in a same satellite constellation.

In act 46, the transmitted navigation measurements are received at the satellites. The received data is processed or identified based on the type of data, an address for which the data was sent or other distinguishing characteristic. Additional data may be received, such as a periodic update of a location of the base stations, clock information, maintenance information, or performance monitoring information. The data is received in a format handled by the satellite, such as receiving time division multiplexed data. The data may be dynamically distributed to other satellites as a function of orbital position. For example, data is relayed between satellites as needed based on the current footprint of each satellite.

In act 48, the navigation measurements from the base stations are transmitted to one or more centralized processing facilities. The transmission is via satellites and/or terrestrial communications. For example, the centralized processing facility receives the navigation measurements broadcast from the satellites in act 50. As another example, the base stations place a point-to-point call through one or more satellites or terrestrially to the centralized processing facility. As yet another example, land based connections are used to communicate to the centralized processing facility.

The navigation measurements or other data from the base stations is received at the centralized processing facility. The centralized processing facility may also receive data from other sources, such as weather, atmospheric or orbital information from government agencies or other entities. The centralized processing facility or another source generates model information, instructions or other data to be used by the network. For example, differential corrections and/or model updates from base stations are used to refine or generate a model. The model may be generated over any time period, such as generating the model information over hours, days or weeks. The model information provided by the centralized processing facility represents non-real-time information or information generated over a time period. Alternatively, the centralized processing facility introduces as little delay as possible.

In act 44, the centralized processing facility communicates with one or more satellites, such as a low earth orbit satellite. The data is uplinked to each given satellite when over one of the centralized processing facilities, or transmitted to one satellite for distribution to other appropriate satellites. The communications received in act 46 are distributed elsewhere in the network through any communications route. For example, model data received from the centralized processing facility at the satellite for low earth orbit satellite information is received for use by base stations in selecting or compressing data. As an alternative to direct communication of navigation measurements from base stations to the satellites, some or all of the navigation measurements are routed through the centralized processing facilities in act 48.

In act 50, the satellite broadcasts the received information to multiple users. The received information is responsive to the measurements made by the base stations. For example, a low earth orbit satellite rebroadcasts the navigation measurements (e.g., differential corrections) from a plurality of base stations to multiple users in real-time or as the navigation measurements are received. Real-time broadcasting is provided without further terrestrial based communications relating to the broadcast data. Delayed broadcasting may be provided.

For each satellite, the navigation measurements are broadcast on a single or a plurality of beams. The same or different data is broadcast in each beam of a same satellite. For example, different data is broadcast due to the different beam locations of a same satellite. Differential corrections and/or model data for one beam is not as relevant or useful as other corrections or model data for a different beam. As the orbital position of the satellite changes, the corrections of model data for a given beam also change. The low earth orbit or other satellite may alternatively or additionally orient the beam or transmitter as a function of the location of one or more base stations. Accordingly, the data for use by the satellite changes less frequently.

Different numbers of base stations may be available at different times for different regions. Until a sufficient number of base stations are available for a given region, it may not be possible to independently observe different navigation error sources. For example, ephemeris errors and satellite clock errors might have a similar signature from a small number of nearby base stations. Fortunately, users in the region do not care about independent corrections. If the independent error sources are unobservable by nearby surrounding base stations, the error sources may be lumped together to form a correction that is good for the local region. However, WAAS and other existing low-latency ephemeris corrections may be used to augment the base station network to provide improved ephemerides.

In act 52, the navigation measurements broadcast by one or more satellites are used by receivers to determine location or position. The receivers also receive navigation signals in act 40. Using the navigation signals and corresponding corrections, the receiver calculates a differential based position. Alternatively or additionally, model information is used to refine the determined position. In addition to or as an alternative to use of the broadcast information, the receiver receives local base station information transmitted terrestrially in a local area. For example, locally transmitted differential corrections from a closest base station and satellite broadcast corrections from a next closest base station are used to determine position.

In act 54, the performance of each base station or the network of base stations is monitored. Each base station itself or other components of the network monitor each base station. Where performance of a given base station is not sufficient or declines, navigation measurements from the given base station are not included for broadcast. The performance is monitored by signal strength of received navigation signals, difference of location determination for a stationary antenna at different times, multipath noise, other unexpected anomaly or quality of navigation measurements. For example, a given base station determines differential corrections. The differential corrections are sufficiently different than for one or more adjacent base stations, indicating poor quality data. Where the position of the base station calculated from received navigation signals is inaccurate, the base station is not used to transmit navigation measurements.

The monitoring occurs during initial operation of a base station. After a base station is first registered in the network or before registration, the performance or data quality is checked. The performance or quality is monitored for ongoing use as well. Where a part fails, an obstruction is added, multipath interference increases or other undesired change is identified, the navigation measurements that may be inaccurate are not used in the network to avoid errors. Accurate data is possible included for dissemination.

Any number of base stations and corresponding navigation measurements are provided for a given beam of a satellite. Where a network continues to grow, excess base stations and corresponding navigation measurements may result. The bandwidth of the information for the transmission to the satellite, broadcast by the satellite or combinations thereof is limited. Navigation measurements or base stations are selected or compressed in act 56 to limit bandwidth. The information from the network of base stations is selected for broadcast from the satellites.

In one embodiment, the selected information corresponds to a subset of the base stations of the network. Some base stations are included and others excluded for use with satellite dissemination at a given time. For include base stations, non-redundant information as compared to broadcast data received at the base station is selected for transmission to and broadcast by one or more satellites, avoiding redundancy.

Other bandwidth limiting acts may be used as discussed, above. Information is selected in response to a user request and/or as a function of a location of a user. The information is selected to favor one user over another user. The information is selected as a function of distribution of the reference stations of the network, such as for an even distribution or relative to one or more specific points. The selection may be based on criteria that vary as a function of time or are static.

Increasing numbers of base stations provides an increasing likelihood of better accuracy in position determination using the satellite based communication of differential corrections. Where low earth orbit satellites are used to disseminate navigation measurements in addition to navigation signals broadcast by navigation satellites, the number of desired base stations increase due to the small footprint of beams of low earth orbit satellites. The network of base stations and low earth orbit satellites provides for use by receivers over a wide area with differential corrections for smaller areas. Networks using geosynchronous or other higher than low earth orbit satellites may also benefit from an increased number of base stations.

Figure 5:
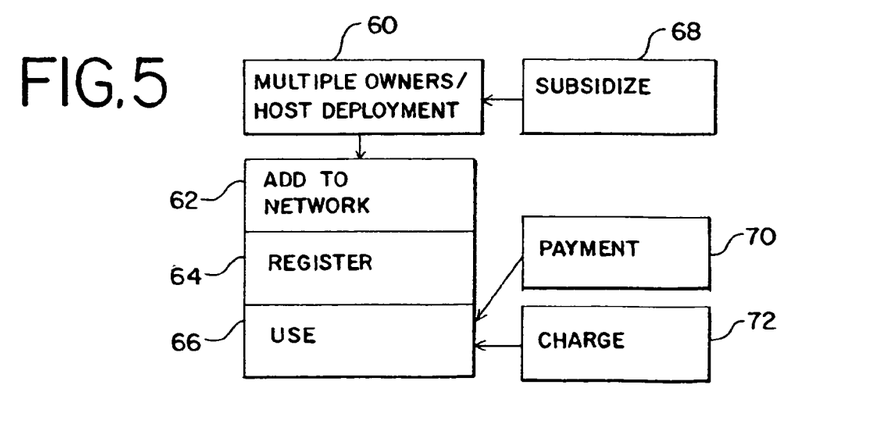
FIG. 5 is a flow chart diagram of one embodiment of a method for deployment of a differential positioning network.

FIG. 5 shows one embodiment of a method for deploying a differential positioning network using satellite communications of differential corrections, model data or other navigation measurements. The method uses the network and components shown in FIGS. 1-3 or other networks or components. The acts of FIG. 5 are provided in the order shown or a different order. Additional, different or fewer acts may be provided. For example, acts 64, 68, 70 and/or 72 are optional. Acts 68, 70 and 72 correspond to financial incentive to others for adding base stations to the network. Any of the acts 68, 70 or 72 may be sufficient alone or in any possible combination thereof, or other incentives may be provided.

In act 60, different entities are allowed to own different base stations for use in the differential positioning network. Different entities include individuals, corporations, public agencies, governments or other entities. Private and/or public ownership of base stations is provided in a same network. The company or individuals managing or running the network may own none, some or all of the base stations.

The base stations are sold to the different entities. The base stations are provided or manufactured by one or a plurality of entities. In act 68, the cost of the base stations sold to the different entities is subsidized by one or more other entities. For example, a network manager pays one or more manufacturers to include satellite communications capabilities in addition to the navigation receiver in base stations sold to others. As another example, a network manager sells base stations to other entities for use with at least a portion of the cost of the extra satellite communications capabilities subsidized. The base stations may be sold for local use at market prices with the extra communications capabilities provided at or below cost of the extra components. The subsidy may result in the base station being below market cost even for local use. The base station or the extra satellite communications components are sold with a low or negative margin to provide incentive to others entities to operate the base stations. In another embodiment, an entity is paid to own or host the base station.

The subsidies or price of the base stations may vary as a function of different factors. For example, a base station being sold to a customer or entity in an area with few base stations in the network may be cheaper, such as at cost, than the base station being sold for use in a more dense population of base stations in the network.

As an alternative to selling base stations for ownership by different entities, different entities host different base stations for use in the differential positioning network. The base stations are rented to or provided free to the different entities. As yet another alternative, a single entity hosts and/or owns the base stations in the network.

The different entities provide installation sites for respective base stations. For example, a plurality of farmers and/or construction companies provides installation sites with no or some desired terrestrial power or communications connections. The sites may be a farm, a construction site, a building, a tower, a buoy, a field, or other location. Where solar or other freely available power source is not used, the different entities power the base stations. For example, many entities currently purchase local base stations, such as for use in land leveling. The entities provide a location and power for the base station. Base stations with additional satellite communications capabilities are located and powered in the same way.

In act 62, the base stations are added to the differential positioning network. The base stations are registered in act 64. After installation, the base station collects tens of hours of GPS L1/L2 or other navigation data. The base station may also listen for nearby base stations through a wireless terrestrial data link. Differential corrections from satellite broadcasts may also be obtained. The base station then decimates, compresses and/or pre-processes the data and sends the data to the centralized processing facility via satellite communications. This call registers the precise location and phone number of the new base station and optionally information about data reception quality from nearby base stations. Alternatively, the base station, after any performance checks, merely participates in the network. Once a satellite receives navigation information from the base station, the information is used to identify the base station by a unique address. Other registrations, such as manual registration, may be used.

In act 66, the base station is used in the network. After registration, the base station generates differential corrections or other navigation measurements. The base station operates as discussed herein for use in disseminating navigation measurements to mobile devices with satellite communications. Any of addition in act 62, registration in act 64 or use in act 66 may trigger a payment in act 70, such as a payment of a subsidy from act 68 or a reimbursement, or trigger a charge in act 72.

During any of acts 62, 64 and 66, the integrity of operation of the base station is monitored. Signal strength profiles, phase residuals or combinations thereof are monitored. For example, the base station calculates local multipath estimates versus azimuth and elevation. Although the multipath environment may change due to motion of vehicles, weather and other effects, a feed-forward initial multipath model may improve the code phase measurements from the base station. This can be applied at the base station or at a separate processing facility (e.g. the satellite or a centralized processing facility). The model can be refined with time. Improper installation of base stations may lead to bad differential corrections. Due to the "plug-and-play" nature of these base stations, the quality control of installations may not be as high as for lower density base station networks. The data collected during registration is used to monitor signal strength profiles and phase residuals to look for obstructions, excessive multipath, and antenna motion. The base station can self-monitor itself thereafter and report when detection of any potential problem.

During the use of act 66, low earth orbit or other satellite communication of differential correction or other navigation measurement data is provided by the differential positioning network. The potential for access to data from each of the base stations in the network is provided at a same or different time to a mobile navigation receiver. Correction data from a first base station is provided in a first area, and correction data from a second base station is provided in a different, second area.

Real-time data from customer base stations is made accessible to the same or other customers via satellite dissemination. The real-time base station data satellite dissemination is done entirely through satellite communication. The corrections are provided by communicating or transmitting data directly from the base stations to satellites. In some embodiments, the dissemination is handled by the satellites and not necessarily ever sent back to centralized processing facilities. For example, a satellite acts like a repeater, rebroadcasting the signal on the beam from which the signal was received and optionally on adjacent beams.

Optionally, the real-time data is also or alternatively broadcast via terrestrial data link. The base stations transmit data to the centralized processing facilities via satellite and/or terrestrial communications. The centralized processing facilities transmit different or the same data to the satellites for dissemination to receivers and/or base stations. Some base stations in the network may communicate over one communications path, such as direct communication with satellites for broadcast to receivers, and other base stations communicate over a different communications path, such as through a centralized processing facility. Optionally, the real-time data is also accessible to the network provider.

Since different entities own or host different base stations, the corrections or other navigation measurements are broadcast to the different entities or other customers of the network from the satellites. The differential corrections are broadcast as a function of beam footprint of each satellite. For example, data is broadcast to receivers from low earth orbit satellites in one or more beams. Each of the beams has a footprint covering or adjacent to locations of one or more of the base stations. The location of the footprint varies as a function of time. Differential corrections received from base stations in a given footprint at a given time are rebroadcast in the same beam and possibly adjacent beams. The differential corrections are used by the receivers in the footprint to determine a position. The receivers determine the position as a function of navigation signals from a navigation satellite, the differential corrections, and/or model data. The differential corrections allow the receivers to determine respective locations with differential accuracy.

Where a local base station provides differential corrections terrestrially, the mobile receive may ignore or incorporate the satellite provided differential corrections. For example, in a local area of a base station owned by entity A, the mobile receives of entity A use the local differential corrections with or without satellite broadcast corrections. Receivers of entity B may not be able to use the local differential corrections even if within the range of the terrestrial transmissions. The receivers of entity B use the satellite broadcast differential corrections. Where the receivers for entity A move outside the range of an entity an owned local base station, the receivers use differential corrections broadcast from a satellite. The same arrangement is provided for other entities throughout the network.

The data bandwidth of the differential corrections or navigation measurements for satellite communication may be limited, such as by choosing a subset of differential corrections to transmit to or from the satellites, base stations and/or central processing facilities. Different data may be transmitted to or from different components of the network. For example, a centralized processing facility receives differential corrections from the base stations, such as broadcast by the satellites for real-time operation. The centralized processing facility generates model information as a function of the differential corrections and transmits the model information to the satellites. The base stations transmit the differential corrections directly to the satellites. The satellites broadcast the model information and the differential corrections to receivers.

As another example, after registration in act 64, the base station broadcasts differential GPS corrections through a terrestrial or satellite data link and awaits a command via satellite data modem to send corrections and possibly corrections of one or more neighbor base stations received terrestrially through the satellite data modem in an efficient compressed format. The efficiency of this compressed format may be improved by listening to corrections coming from the satellite and providing information that is not redundant. Some base stations may be commanded to send continuous real-time information while others might be queried periodically to allow cycle ambiguities to be handed off through the network of base stations and/or to refine an atmospheric model. Base stations that are observed to be in regions of faster changing atmospheric delays (e.g., base stations along a weather front) might be queried more frequently than those in more stable regions. The periodic queries ask for data at a time or times other than the time of the query. For example, base stations A, B, C, and D might be asked for navigation observations for times t=0 and t=10 at t=11, t=12, t=13, and t=14 respectively. In another embodiment, instead of sending navigation observations, each base station might send corrections to atmospheric delay and delay rate models broadcast from the satellite based on recently made navigation observations. In another embodiment, combinations of navigation observables and atmospheric model parameters are sent from the base station.

In act 72, customers are charged for use of data provided via a satellite in the differential positioning network. The customers include or exclude the different entities that own or host base stations. In one embodiment, the customers are any entity with a mobile device that uses the network. Separate or different charges may be provided for different entities or different uses. For example, charges are only incurred when satellite disseminated navigation measurements are used. As another example, charges are incurred when the network is used for either satellite or terrestrial navigation measurements.

The charges may be set to encourage entities to own or host a base station. For example, less is charged for use of the satellite broadcast navigation measurements for use of mobile device associated with the entity owning or hosing one or more base stations. The charges are less for any use of the network or only for specified regions. Set-up or other one time charges may be waived with a subscription to the satellite correction service or ownership of a base station.

In one embodiment, customers are charged a flat subscription rate. In another embodiment, customers are charged as a function of use of the navigation measurements provided via the satellites. Instead of or in addition to a flat subscription rate for a given time period, a per-use subscription is offered. For example, a six month subscription might cost $300 plus $1/hour of active use.

Customers may be charged for use of the navigation measurements provided via the satellites as a function of time and/or type of operation. Due to differing economics, different operations may have different financial benefits. For example, a farmer might benefit less than a construction surveyor. Because the products used in these two operations are typically different, the subscription charge is a function of the product. For example, a monthly or yearly rate is different. As another example, a per use rate is different. Additionally, even in the same product, the burn rate may be adjusted based on the mode of operation. For example, a farm auto steering system with a very wide implement configured has a usage or periodic subscription at a slower rate than the same product configured to use a narrow implement.

Similarly, the charges may be based on the location of use. Navigation signals broadcast from the satellites for use away from a local base station are different (more or less) than charges for use near or within range of the local base station. For example, use of the network or broadcast navigation measurements are free when near and more when away from a specific base station. As another example, usage if not near an owned or hosted base station is charged at a higher rate than when near the specific base station, such being free within terrestrial wireless range of the specific base station.

The charges may vary based on time in addition or as an alternative to region. Based on knowledge of regional terrestrial DGPS solutions and other customer demand factors, rates may be adjusted regionally or seasonally to account for variations in demand. A per-hour fee changes with time and/or location. The burn or usage rate for a given region or time is broadcast by the satellites and displayed to the user. A warning may be displayed to the user when their rate changes.

The use of signals or a mobile device is monitored by software. The software may monitor usage and report the usage over a later wired or wireless connection, such as a transmission from the mobile device to a satellite. Alternatively, the software is enabled by pre-purchase of time, content or data size. Once the pre-purchases resources are expended, the mobile device is shut down or provides a lesser service, such as using navigation signals without differential information from satellites for determining position. Encryption of the navigation measurements may be used to better enable monitoring of usage and prevent hacking or unauthorized use of the network or satellite broadcast navigation measurements. Any now known or later developed monitoring or tracking of usage may be provided.

One possible subscription model charges for use of the navigation measurements provided via the satellites when coverage by a local base station is out. For customers that operate close to local base stations, a possible discount subscription model is provided. If a customer elects this subscription model, the subscription rate is lower than a more general subscription, but the satellite service is only provided to flywheel or for use through outages in local coverage due to terrestrial data link outages. To further encourage ownership or hosting of a base station, one or more roving unit (receivers) per base station is enabled for an even lower or free flywheel subscription fee. The specific receivers are matched with the base stations. For example, an encrypted feature code generated by the network service provider as a function of the rover and base station serial numbers is entered into the receiver to enable the receiver for the type of subscription, such as a free flywheel subscription. As another example, the network service provider enables only one feature code per base station based on the mobile device identity, such as installing software to provide encryption for the one or more specific receivers.

Different levels of subscription are provided in other embodiments. For example, two subscription-based services are used to provide improved accuracy and redundancy. One subscription may be for a Geosynchronous type satellite differential network and another for a low earth orbit satellite differential network. Other combinations are possible, such as using a subscription for local or terrestrial based differential corrections or charging different rates for different types of data (e.g., model information or differential corrections). Reduced rate subscriptions may be offered by one or both providers of the redundant subscriptions to account for the fact that user demand for a second service is lower than for the first service. One or more redundant subscription may be charges at a lesser rate to encourage base station ownership or hosting. Cost or subscription charge sharing arrangements to encourage redundant subscriptions may be provided.

Customers may subscribe to features or features may be included in any other subscription. Due to factors such as satellite-to-satellite or satellite-to-ground beam failures or signal obstruction, there may be brief periods when satellite broadcast navigation measurements are not available. In a coverage prediction feature, most outages resulting from satellite problems can be predicted in advance. The feature to predict outages could be used to plan operations to be in regions where terrestrial data link coverage is solid when satellite corrections are unavailable. Outages resulting from physical obstructions can be potentially avoided based on knowledge of communication satellite positions. For example, operations near obstructions could be avoided at times when the communication satellite planes are low on the horizon. Customers are notified via satellite communications of a predicted outage and suggested courses of action, such as based on current location of a mobile device and/or beam footprint.

For low earth orbit satellites, outages caused by satellite failures are likely very brief During these periods, a user can fall back to a redundant subscription or complementary service, if available, such as WAAS, a terrestrial data link, OmniStar, JPL, USCG Beacons, a local private reference station, local commercial networks, local community cooperatives networks, local government funded networks, Pseudolite transmitters, or other free or subscription-based satellite dissemination services.

Another feature is base station or mobile device software upgrades. The software is upgraded by broadcast from a satellite. Alternatively, a point-to-point communications link is established through the satellites to upgrade the software of a specific component. Swapping to new software for a plurality of devices may be triggered via satellite broadcast command for network based implementation. The software upgrades are provided for free or at a charge. The charge is different or the same for owners or hosting entities of base stations.

Depending on the data storage capacity at the base stations, navigation observables are stored for tens of hours to several weeks. This data is made available for post processing, such as by the base station or by the centralized processing facility for model updates. This access is free or for a charge. For example, proprietary software or unencryption is used to access the data or the results of processing are offered for a download fee. The access is provided with satellite communications. If internet or land-based access is available at the base stations, the data is accessed via the internet. After a certain delay, the data could be offered for free to researchers.

In act 70, the different entities are paid for owning or hosting a base station. For example, the different entities are paid a percentage or set amount for collections from other customers. As other customers use or subscribe to the network or navigation network, the owners or hosting entities receive payment. The payment may be limited based on use of the owned or hosted base station. For example, the owner receives payment for any broadcast of navigation measurements from the owned base station. As another example, the owner receives payment for any actual usage by a mobile device of navigation measurements from the owned base station. This limited payment may encourage ownership or hosting of multiple base stations distributed over a large area.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A system for communicating position information, the system comprising:
   a plurality of reference stations operable to make navigation measurements, cycle ambiguities associated with multiple ones of the reference stations of the network; and
   one or more low earth orbit satellites operable to broadcast data responsive to the navigation measurements to multiple receivers;
   wherein the reference stations are operable to transmit the navigation measurements directly to the one or more satellites, and wherein the one or more satellites are operable to rebroadcast the navigation measurements on one or more beams.

2. The system of claim 1 wherein a centralized processing facility is operable to receive the broadcast navigation measurements, the centralized processing facility being operable to generate model information as a function of the navigation measurements, and the centralized processing facility operable to transmit the model information to the one or more satellites.

3. The system of claim 2 wherein the navigation measurements comprise differential corrections, model corrections or both differential and model corrections.

4. The system of claim 2 wherein the model information comprises model information for a weather model, an atmosphere model, an orbital model or a combination thereof.

5. The system of claim 2 wherein the one or more satellites are operable to rebroadcast the navigation measurements in real-time and wherein the centralized processing facility is operable to transmit the model information after a delay.

6. The system of claim 2 wherein, at a given time, some reference stations transmit differential corrections directly to the one or more low earth orbit satellites and others of the reference stations transmit navigation measurements to the centralized processing facility through the one or more satellites, the navigation measurements being the differential corrections or model information.

7. The system of claim 2 wherein the receivers are operable to receive the navigation measurements from one or more satellites, the receivers each operable to determine a location with the navigation measurements from the one or more satellites and navigation signals from the one or more navigation satellites.

8. The system of claim 1 wherein the reference stations analyze the navigation measurements of other reference stations.

9. The system of claim 1 further comprising a user receiver operable to receive at least some of the navigation measurements terrestrially from at least one of the reference stations.

10. The system of claim 1 wherein the reference stations are operable to determine an error and distinguish between an environmental error and reference station movement error.

11. The system of claim 1 wherein the reference stations comprise multiple antennas.

12. The system of claim 1 wherein the reference stations are operable to receive the navigation measurements of other ones of the reference stations and only transmit non-redundant corrections.

13. The system of claim 1 further comprising a dual band user receiver.

14. The system of claim 1 wherein the reference stations are operable to transmit carrier phase information.

15. The system of claim 1 wherein the reference stations are operable to transmit the navigation measurements terrestrially.

16. A system for communicating position information, the system comprising:
    a plurality of reference stations each operable to make navigation measurements, cycle ambiguities associated with multiple ones of the reference stations of the network; and
    multiple low earth orbit satellites operable to broadcast data responsive to the navigation measurements to multiple receivers;
    wherein the reference stations are each operable to analyze the navigation measurements of other reference stations and to transmit the navigation measurements directly to the one or more satellites having a beam footprint over the reference station at the time of transmission such that different reference stations communicate with different ones of the low earth orbit satellites at a given time and such that less than all of the navigation measurements are transmitted by the reference stations to the low earth orbit satellites;
    wherein the one or more satellites are operable to rebroadcast the navigation measurements on one or more beams, each satellite rebroadcasting the navigation measurements responsive to a sub-set of the reference stations at a given time, the sub-set being reference stations within or adjacent to the beam footprint of the one or more beams of each satellite; and
    wherein the navigation measurements are dynamically distributed between different satellites so that navigation measurements appropriate for a given region are transmitted to that region and the navigation measurements broadcast by each of the satellites varies as a function of the location of the beam footprint.

17. The system of claim 16 wherein the reference stations are operable to determine an error and distinguish between an environmental error and reference station movement error.

18. The system of claim 16 wherein the reference stations are operable to receive the navigation measurements of other ones of the reference stations and only transmit non-redundant corrections.

\* \* \* \* \*